(12) United States Patent
Popa

(10) Patent No.: US 11,635,016 B2
(45) Date of Patent: Apr. 25, 2023

(54) SEAL AND FLUID VALVE

(71) Applicant: Vitesco Technologies GmbH, Hannover (DE)

(72) Inventor: Alexandru Popa, Schwalbach a Ts. (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 196 days.

(21) Appl. No.: 17/046,258

(22) PCT Filed: Apr. 8, 2019

(86) PCT No.: PCT/EP2019/058778
§ 371 (c)(1),
(2) Date: Oct. 8, 2020

(87) PCT Pub. No.: WO2019/197321
PCT Pub. Date: Oct. 17, 2019

(65) Prior Publication Data
US 2021/0079833 A1 Mar. 18, 2021

(30) Foreign Application Priority Data
Apr. 12, 2018 (EP) .................................. 18465513

(51) Int. Cl.
*F01P 7/14* (2006.01)
*F16K 25/00* (2006.01)
(Continued)

(52) U.S. Cl.
CPC .............. *F01P 7/14* (2013.01); *F16K 25/005* (2013.01); *F01P 2007/146* (2013.01);
(Continued)

(58) Field of Classification Search
CPC ..... F01P 7/14; F01P 2007/146; F16K 25/005; F16K 5/0678; F16K 11/0873; F16J 15/104
See application file for complete search history.

(56) References Cited

U.S. PATENT DOCUMENTS 3,210,042 A * 10/1965 Freeman ............... F16K 5/0678
251/315.05
3,357,679 A * 12/1967 Gulick .................. F16K 5/0673
251/315.13
(Continued)

FOREIGN PATENT DOCUMENTS

| CN | 101487536 | 7/2009 |
| CN | 104948752 | 9/2015 |

(Continued)

OTHER PUBLICATIONS

International Search Report issued in corresponding PCT Application PCT/EP2019/058778.
(Continued)

*Primary Examiner* — Matthew W Jellett
*Assistant Examiner* — Christopher D Ballman
(74) *Attorney, Agent, or Firm* — Cozen O'Connor

(57) ABSTRACT

A seal for use in a fluid control valve includes: a first, elastically deformable, plastic part; and a second plastic part configured as a hard seal element and connected to the first plastic part. The first and the second plastic parts form a seal assembly having a first frontal end configured to bear in a sealing manner on an actuatable valve body of the fluid control valve, and a second frontal end configured to bear in a sealing manner on a valve housing of the fluid control valve, wherein at least the first frontal end has a first end side having an encircling projecting bead configured to seal against the actuatable valve body.

19 Claims, 3 Drawing Sheets

(51) Int. Cl.
*F16K 11/087* (2006.01)
*F16K 5/06* (2006.01)
*F16J 15/10* (2006.01)

(52) U.S. Cl.
CPC ........... *F16J 15/104* (2013.01); *F16K 5/0678* (2013.01); *F16K 11/0873* (2013.01)

(56) References Cited

U.S. PATENT DOCUMENTS

| | | | | |
|---|---|---|---|---|
| 3,380,708 A * | 4/1968 | Scaramucci | ........... | F16K 5/0642 |
| | | | | 277/369 |
| 3,397,861 A * | 8/1968 | Scaramucci | ........... | F16K 5/0673 |
| | | | | 277/369 |
| 3,455,534 A * | 7/1969 | Scaramucci | ........... | F16K 5/0673 |
| | | | | 251/192 |
| 3,486,733 A * | 12/1969 | Gordon, Jr. | ........... | F16K 5/0673 |
| | | | | 251/315.05 |
| 3,584,641 A * | 6/1971 | Milleville | ............... | F16K 5/227 |
| | | | | 251/315.08 |
| 3,610,575 A * | 10/1971 | Yoneda | ................. | F16K 5/0673 |
| | | | | 251/315.08 |
| 3,918,681 A * | 11/1975 | Eberhardt | ............. | F16K 5/0678 |
| | | | | 251/363 |
| 4,163,544 A * | 8/1979 | Fowler | ................. | F16K 5/0673 |
| | | | | 251/315.08 |
| 4,172,599 A * | 10/1979 | Forch | .................... | F16J 15/322 |
| | | | | 277/572 |
| 4,254,793 A * | 3/1981 | Scaramucci | ............ | F16K 24/00 |
| | | | | 251/315.08 |
| 4,293,116 A * | 10/1981 | Hinrichs | ............... | F16K 1/2266 |
| | | | | 251/173 |
| 4,502,663 A * | 3/1985 | Huber | ................... | F16K 5/0631 |
| | | | | 251/315.13 |
| 4,544,168 A * | 10/1985 | Hans | ..................... | F16C 33/783 |
| | | | | 277/925 |
| 4,944,489 A * | 7/1990 | Adams | .................. | F16K 1/2266 |
| | | | | 251/306 |
| 5,178,364 A * | 1/1993 | Garrigues | .............. | F16J 15/322 |
| | | | | 251/306 |
| 5,419,532 A * | 5/1995 | Fan | ....................... | F16K 5/0673 |
| | | | | 251/315.08 |
| 5,535,986 A * | 7/1996 | Hutchens | .............. | F16K 1/2266 |
| | | | | 251/306 |
| 5,685,520 A * | 11/1997 | Velan | .................... | F16K 1/2266 |
| | | | | 251/305 |
| 5,746,417 A * | 5/1998 | Bowers | ................. | F16K 5/0636 |
| | | | | 251/188 |
| 6,116,575 A * | 9/2000 | Ahn | ...................... | F16K 5/0678 |
| | | | | 251/173 |
| 6,361,051 B1 | 3/2002 | Babin | | |
| 6,641,141 B2 * | 11/2003 | Schroeder | ................ | F16J 15/48 |
| | | | | 277/572 |
| 6,698,613 B2 * | 3/2004 | Goto | ...................... | B60K 15/03 |
| | | | | 220/657 |
| 7,032,880 B2 * | 4/2006 | Scaramucci | .......... | F16K 5/0673 |
| | | | | 251/359 |
| 7,963,503 B2 * | 6/2011 | Day | ...................... | F16K 1/2266 |
| | | | | 251/305 |
| 8,328,160 B2 * | 12/2012 | Abel | ....................... | F16K 25/00 |
| | | | | 251/315.01 |
| 8,500,090 B2 * | 8/2013 | Hubacek | ............... | F16K 5/0673 |
| | | | | 251/192 |
| 2004/0239047 A1 * | 12/2004 | Kent | .................... | F16J 15/3236 |
| | | | | 277/628 |
| 2005/0072953 A1 | 4/2005 | Caprera | | |
| 2008/0179558 A1 * | 7/2008 | Lloyd | .................... | F16K 5/0673 |
| | | | | 251/180 |
| 2016/0245406 A1 * | 8/2016 | Ryther | ....................... | F16J 9/12 |

FOREIGN PATENT DOCUMENTS

| | | |
|---|---|---|
| DE | 196 32 533 | 10/1997 |
| DE | 20 2015 100 400 | 5/2016 |
| EP | 1 318 337 | 6/2003 |
| GB | 1 229 515 | 4/1971 |
| TW | 201623850 | 7/2016 |

OTHER PUBLICATIONS

Written Opinion issued in corresponding PCT Application PCT/EP2019/058778.

Office Action issued in corresponding European application No. EP 18465513.2.

Office Action dated Nov. 9, 2021 issued in Chinese Patent Application No. 201980024950.9.

\* cited by examiner

SEAL AND FLUID VALVE

CROSS REFERENCE TO RELATED APPLICATIONS

This is a U.S. national stage of International application No. PCT/EP2019/058778, filed on Apr. 8, 2019, which claims priority to European Application No. 18465513.2, filed Apr. 12, 2018, the content of each of which is incorporated herein by reference.

BACKGROUND OF THE INVENTION

1. Field of the Invention

The present invention relates to a seal and to a fluid control valve having such a seal. A fluid control valve should be understood here as being in particular a cooling water control valve, in particular for use in a vehicle. A vehicle should be understood here as being any kind of vehicle which needs to be supplied with a liquid and/or gaseous fuel for operation, but in particular passenger cars and/or utility vehicles. Furthermore, the vehicle may also be a partially electric or fully electric vehicle, but in particular passenger cars and/or utility vehicles.

2. Description of the Prior Art

Seals as such can have different roles. They can, for example, serve to avoid or at least to limit undesired fluid losses. A fluid can be understood here to be a liquid and/or gaseous medium.

SUMMARY OF THE INVENTION

An object of the present invention is to provide a seal for use in a fluid control valve, in particular in the form of a cooling water control valve, the seal complying with the highest demands placed on long-term tightness under known large temperature fluctuations of a combustion engine periphery and/or an electric motor periphery. The seal should furthermore be cost-effective to produce.

This object may be a seal for use in a fluid control valve, the seal including a first, elastically deformable plastic part, and a second plastic part configured as a hard seal element and which is connected to the first plastic part. The first and the second plastic parts herein form a seal assembly having a first frontal end for bearing in a statically sealing manner on an actuatable valve body of the fluid control valve, and a second frontal end for bearing in a dynamically sealing manner on a valve housing of the fluid control valve. The first frontal end herein has a first end side having an encircling projecting bead for sealing against the actuatable valve body. However, the second frontal end can also have a second end side having an encircling projecting bead for sealing against the valve housing.

A hard seal herein is to be understood to be a hard plastic which per se, in an installed position of the seal in the fluid control valve, in the interaction with the valve body in which the valve body impinges the seal with pressure and thereby stresses the latter, cannot be elastically compressed or at least not substantially elastically compressed. The pressure exerted on the seal herein varies, depending on a tolerance-related position of the fluid control valve and as a result of an adjustment or actuation, respectively, of the valve body.

The hard seal on the valve-body side imparts the seal a desired hardness and frictional capability so as to be able to interact with the valve body in an optimal manner. In contrast, the first plastic part imparts the seal a desired elastic deformation capability, or a desired elastic behavior, respectively. The hard seal herein can be, for example, a PTFE plastic (PTFE herein stands for polytetrafluoroethylene), and the like. In contrast, the first plastic part can be, for example, an EPDM plastic (EPDM herein stands for ethylene propylene diene monomer), and the like. The object set at the outset is achieved by the proposed seal.

It is furthermore proposed herein that the second plastic part is configured in the shape of a thin-walled structure, which in the region of the bead seals against the actuatable valve body. This contributes toward savings in terms of materials and costs.

According to one embodiment, the second plastic part at least in the region of the bead can be molded so as to be complementary to the first plastic part, wherein the first plastic part extends into the second plastic part, thereby forming the bead. This also contributes toward savings in terms of materials and costs.

According to a further embodiment, the second plastic part as a thin plastic layer can be vulcanized onto the first plastic part such that the first and the second plastic parts form an integral plastic parts assembly.

According to a further embodiment, at least one support made from plastic and/or metal can be integrated in the first plastic part. The support herein can be configured so as to be closed in an encircling manner. The support can furthermore have at least structure for securing the support relative to the first plastic part.

According to a further embodiment, the support is at least partially insert molded with the plastic of the first plastic part. Alternatively thereto, the support can also be simply joined to the first plastic part. The first plastic part herein can be fitted so as to cover the support or be impressed into the support.

According to a further embodiment, at least one clearance that fluidically or hydraulically, respectively, increases the force is molded on the inside of the first plastic part, or on an encircling internal side of the first plastic part, respectively, in relation to a seal opening. The clearance herein can expediently be configured so as to be closed in an encircling manner. The clearance herein can advantageously be delimited by two mutually opposite, lip-type, elastically deformable portions that fluidically or hydraulically, respectively, increase the force, the portions forming an entry opening of the clearance for a fluid.

Additionally thereto, at least one lip-type, elastically deformable portion that fluidically or hydraulically increases the force can be molded on the seal on the outside toward the valve body in relation to the seal opening. This lip-type portion herein can expediently be configured so as to be closed in an encircling manner.

According to a further embodiment, the first end side of the seal can be set at an angle to a longitudinal direction of the seal, in a manner corresponding to the shaping of the valve body. The valve body in portions can be formed, for example, in a cylindrical and/or spherical manner. The first end side can in this case enclose an angle of about 45° to 75° with the longitudinal direction. This facilitates the sealing action of the seal.

The proposed seal per se can be configured, for example, so as to be toroidal, or at least substantially toroidal. However, other shapes that deviate therefrom are also possible, in principle, and are compatible with the sealing principle that is disclosed in the context of this disclosure.

A fluid control valve having at least one seal of the above-described type for sealing off a connection region of the fluid control valve, in particular in the form of a selector control valve, which can function as a mixing valve or a distribution valve, is furthermore proposed.

A use of such a fluid control valve as a cooling water control valve, in particular of a vehicle, is furthermore proposed. The cooling water control valve can in this case have the function of a mixing valve or distribution valve.

BRIEF DESCRIPTION OF THE DRAWINGS

The invention will be described in more detail in the following text with reference to the illustrations in the figures. Further advantageous developments of the invention can be gathered from the following detailed description of a proposed embodiment. In the drawings.

DETAILED DESCRIPTION OF THE PRESENTLY PREFERRED EMBODIMENTS

Figure 1:
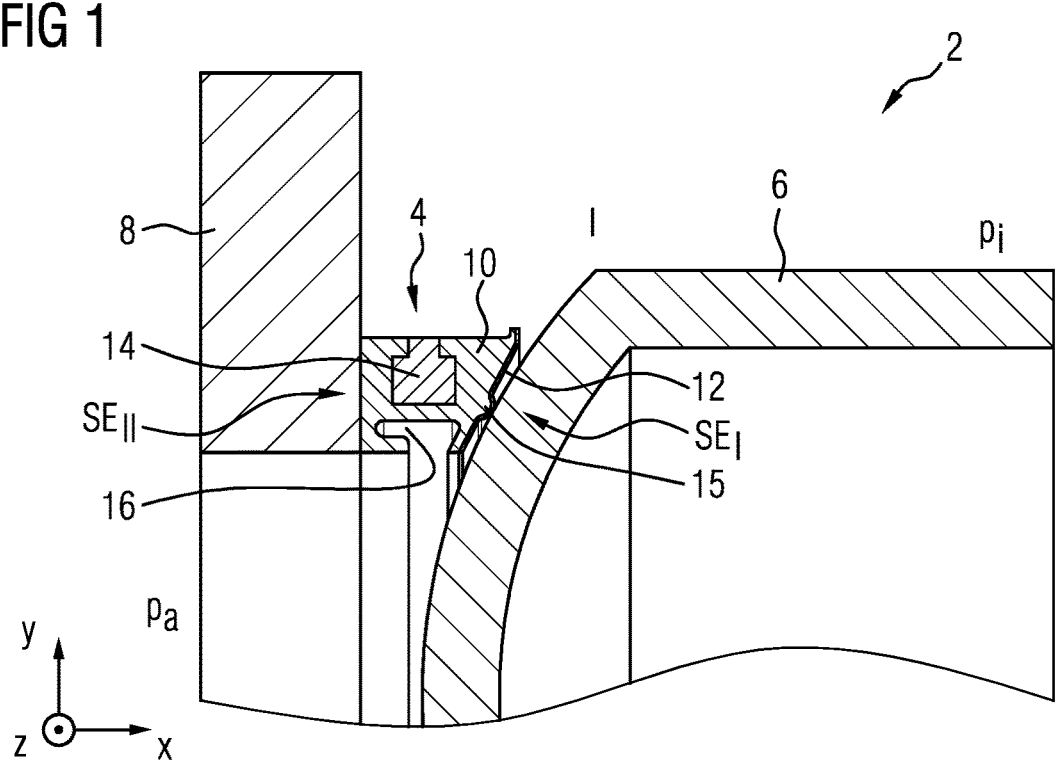
FIG. 1 shows a sectional illustration of an embodiment of a seal proposed according to the invention, in a fluid control valve.
Figure 2:
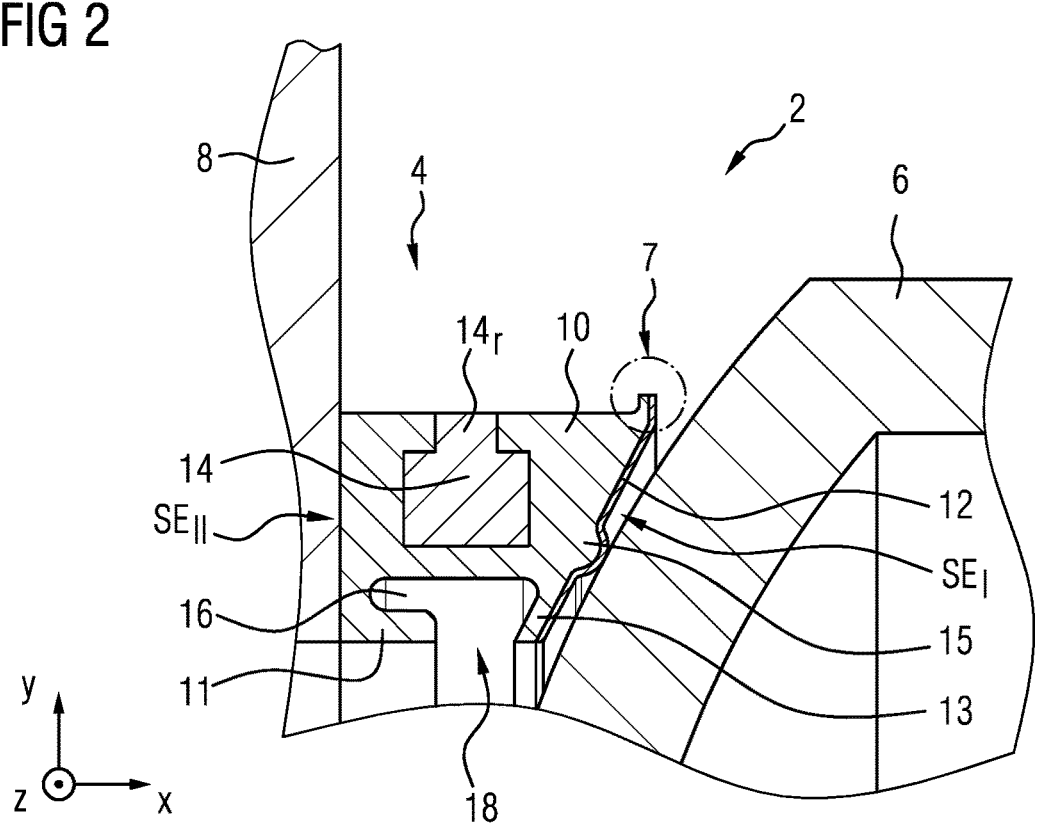
FIG. 2 shows an enlarged illustration of the embodiment shown in FIG. 1.
Figure 6:
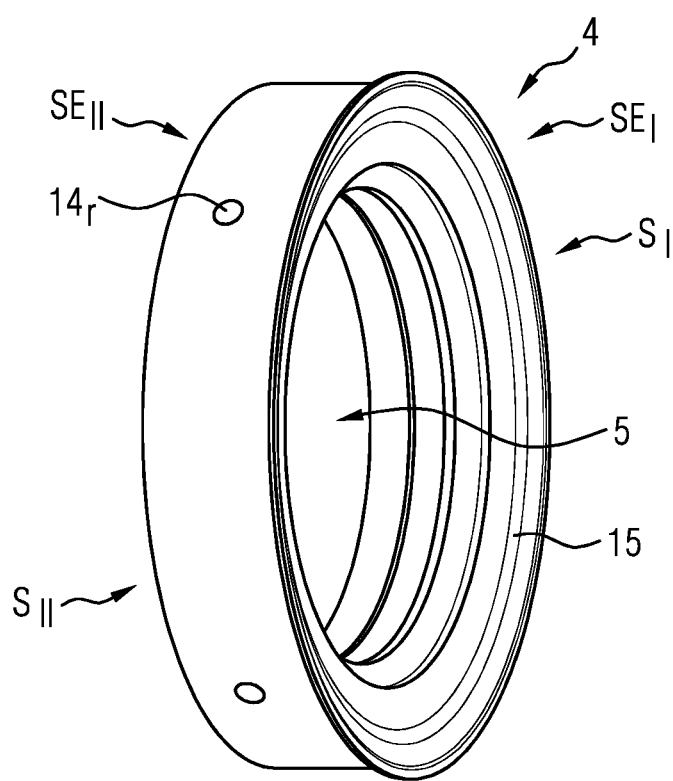
FIG. 6 shows a perspective illustration of the seal shown in FIGS. 1, 2, and 4.

FIG. 1 and FIG. 2 is a sectional illustration of a fluid control valve 2 which is provided for use as a cooling water control valve in a vehicle. The fluid control valve 2 herein can function as a mixing valve or a distribution valve. A toroidal, integral seal 4 in the fluid control valve 2 is disposed between an actuatable valve body 6 that in portions is spherical and a valve housing 8. The seal 4 herein comprises a first, elastically deformable plastic part 10, and a second plastic part 12 configured as a hard seal, which per se in the shape of a thin plastic layer is vulcanized onto the first plastic part 10. This hard seal herein can be configured, for example, from a PTFE plastic or the like. The valve body-side end SET of the seal herein comprises an end side $S_I$ (see FIG. 6) having an encircling projecting bead 15 which interacts in a statically sealing manner with the valve body 6 and herein seals in a linear and/or planar manner.

The plastic layer (part) 12 in the region of the bead 15 is furthermore shaped so as to be complementary to the plastic part 10, wherein the plastic part 10 extends into the plastic layer 12, thereby forming the bead 15.

A clearance 16 that is closed in an encircling manner and fluidically increases the force is molded on an inner side of the plastic part 10, or an internal side of the plastic part 10 that is closed in an encircling manner, respectively, in relation to a seal opening 5 (see FIG. 6), the entry opening 18 of the clearance, which is closed in an encircling manner being delimited by two mutually opposite, lip-type, elastically deformable portions 11, 13 that fluidically increase the force (see FIG. 1 or FIG. 2). The valve body-side portion 13 herein on the side toward the valve body is covered by the plastic layer 12. While this plastic layer 12 per se indeed reduces the elastic deformation capability of the portion 13, this thin-walled portion 13 acts in the manner of an open and flexurally soft profile and in relation to the valve body 6 thus remains elastically deformable to an adequate degree, or demonstrably flexural about a transverse direction Z-Z, respectively, such that the portion 13 additionally supports the sealing action of the bead 15 when the fluidic pressure $p_a$ arises in a corresponding manner. The pressure $p_a$ moreover has the effect that the portion 11 at the valve housing side is elastically deformed toward the valve housing 8, or is demonstrably bent about the transverse direction Z-Z, respectively, and herein additionally supports the dynamic sealing action at the valve housing-side end $SE_{II}$ of the seal 4. The pressure $p_a$ positively widens the entry opening 18 and thus the clearance 16.

Even though this is not shown in the illustrations of the figures, the valve housing-side end $SE_{II}$ of the seal 4 can comprise an end side $S_{II}$ having an encircling projecting bead in principle which interacts in a dynamically sealing manner with the valve housing 8 and herein seals in a linear and/or planar manner.

Furthermore, a lip-type, elastically deformable portion 7 that fluidically increases the force is molded in a closed encircling manner on the seal 4 on the outside toward the valve body in relation to the seal opening 5, the portion 7 per se on the side toward the valve body being covered by the plastic layer 12. It applies herein to the portion 7 in a manner analogous to that of portion 13 that while the plastic layer 12 per se indeed reduces the elastic deformation capability of the portion 7, this portion 7 that acts in the manner of a thin-walled, open and flexurally soft profile and in relation to the valve body 6 thus remains elastically deformable to an adequate degree, or demonstrably flexural about a transverse direction Z-Z, respectively, such that the portion 7 additionally supports the sealing action of the bead 15 when the fluidic pressure $p_i$ arises in a corresponding manner.

The end side $S_I$ of the seal 4 that is toward the valve body is moreover set at an angle to the longitudinal direction X-X of the seal 4, in a manner corresponding to the shaping of the spherical valve body portion 6 (see FIG. 2 or FIG. 2, for example). The end side $S_I$ can in this case enclose an angle of about 45° to 75° with the longitudinal direction X-X, so as to facilitate the sealing action at the valve body side.

Figure 4:
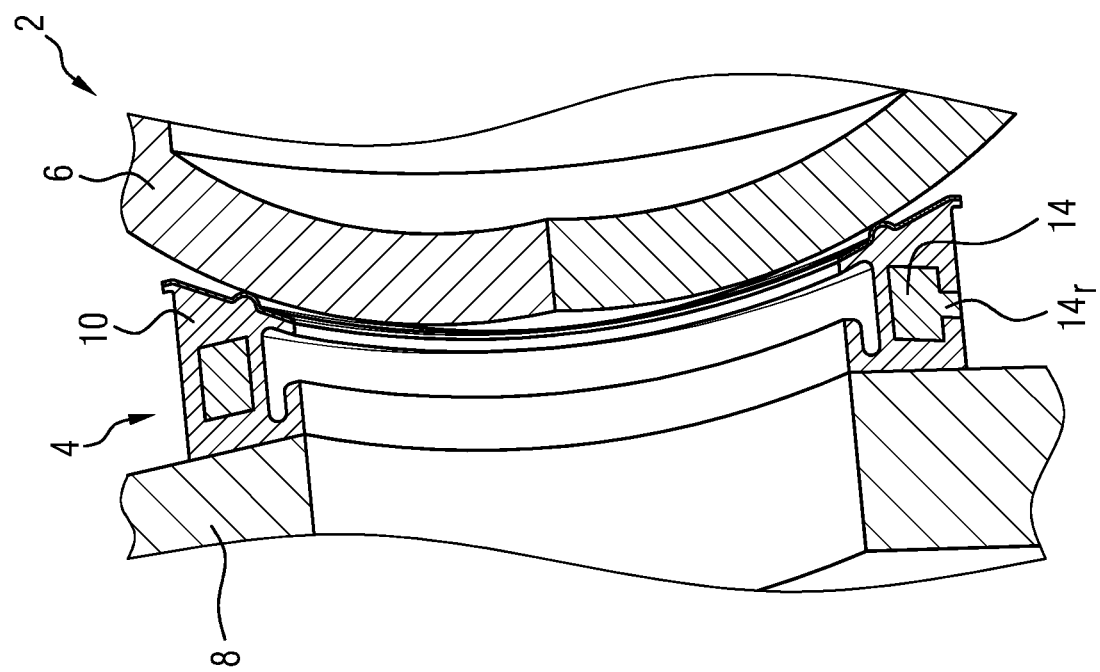
FIG. 4 shows a perspective sectional illustration of the embodiment shown in FIGS. 1 and 2.
Figure 3:
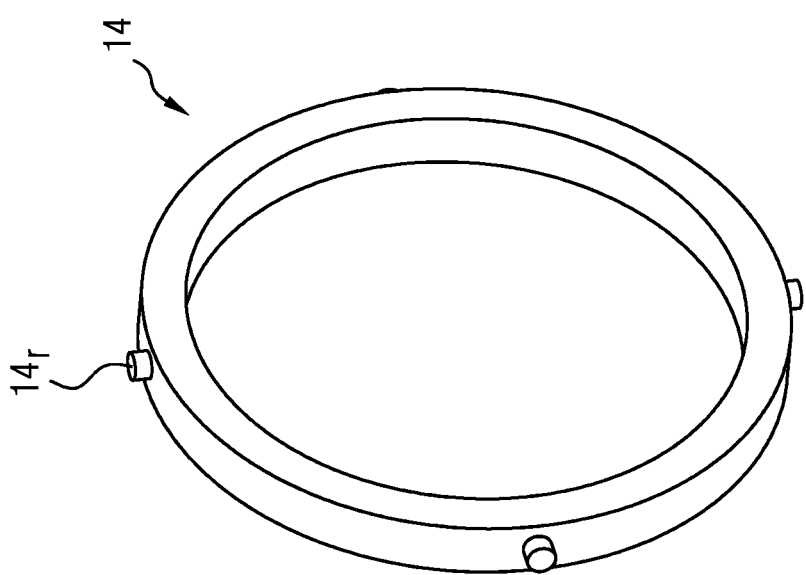
FIG. 3 shows a perspective illustration of the support element shown in FIGS. 1 and 2.
Figure 5:
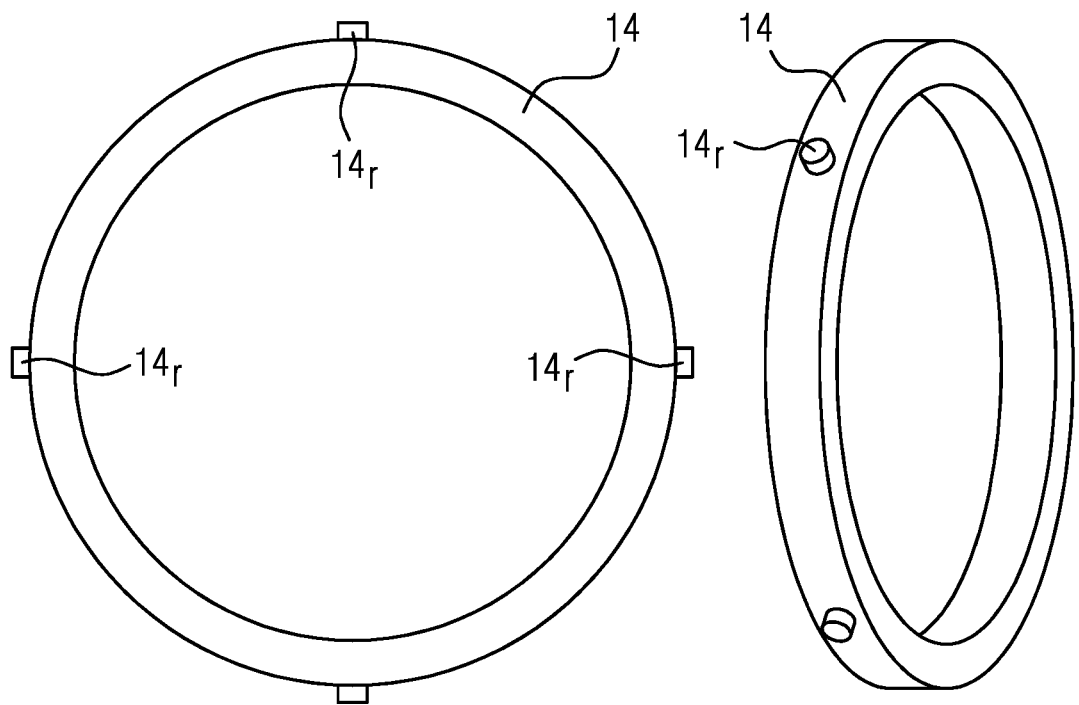
FIG. 5 shows a plan view and a perspective view of the support element.

Furthermore, a toroidal support 14 that is configured from metal or plastic so as to be closed in an encircling manner is integrated in the plastic part 10, the support 14 contributing toward the stability of the seal 4 (see FIG. 1, FIG. 2, or FIG. 3, for example). The support 14 herein is insert molded in a substantially complete manner with the plastic of the plastic part 10. The support 14 furthermore comprises, for example, four pin-type protrusions $14_r$ which are disposed uniformly, that is to say so as to be mutually offset by 90°, across the circumference of the support 14, the pin-type protrusions $14_r$ in relation to the seal opening 5 projecting radially outward from the support 14 on the radially outer side, or on an encircling external side of the support 14. With the exception of the end side of the free end of the respective protrusion $14_r$, the support 14 is completely insert molded from the plastic of the plastic part 10, or is completely integrated in the plastic part 10, respectively, wherein the respective end side terminates so as to be at least substantially flush with the external side of the plastic part 10, for example. These pin-type protrusions $14_r$ herein function to secure the support 14 relative to the plastic part 10. Besides the rectangular cross-sectional shape of the support 14 illustrated in the figures (see FIG. 4, for example), other cross-sectional shapes such as, for example, a circular or a triangular cross-sectional shape are also conceivable in principle. A desired spring rate of the plastic part 10 can also be set by way of a corresponding choice of the cross-sectional shape, and the elastic behavior of the seal 4 can thus be influenced.

Although exemplary embodiments have been explained in the above description, it should be noted that a large number of modifications are possible. It should also be noted that the exemplary embodiments represent merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and these equivalent feature combinations.

The invention claimed is:

1. A seal (4) for use in a fluid control valve (2), comprising:
   a first, elastically deformable, plastic part (10);
   at least one support element (14) configured so as to be closed in an encircling manner made from plastic and/or metal and integrated in the first plastic part (10);
   at least one protrusion (14$_r$) that is part of and extends radially from a radially outer circumferential surface of the support element (14) and configured to secure the support element (14) relative to the first plastic part (10); and
   a second plastic part (12) configured as a hard seal element and connected to the first plastic part (10),
   wherein the first and the second plastic part (10, 12) together form a seal assembly (4) having a first frontal end (SE$_I$) configured to bear in a sealing manner on an actuatable valve body (6) of the fluid control valve (2), and a second frontal end (SE$_{II}$) configured to bear in a sealing manner on a valve housing (8) of the fluid control valve (2), wherein at least the first frontal end (SE$_I$) has a first end side (S$_I$) having an encircling projecting bead (15) configured to seal against the actuatable valve body (6).

2. The seal as claimed in claim 1, wherein the second plastic part (12) is configured in the shape of a thin-walled structure which, in the region of the bead (15), is configured to seal against the actuatable valve body (6).

3. The seal as claimed in claim 2, wherein the second plastic part (12), at least in the region of the bead (15), is molded so as to be complementary to the first plastic part (10), wherein the first plastic part (10) extends into the second plastic part (12), thereby forming the bead (15).

4. The seal as claimed in claim 3, wherein the second plastic part (12) is vulcanized onto the first plastic part (10).

5. The seal as claimed in claim 1, wherein the support element (14) is at least partially insert molded with the plastic of the first plastic part (10).

6. The seal as claimed in claim 1, further comprising at least one clearance (16) configured to fluidically increase the force of flow, the at least one clearance (16) being molded on the inside of the first plastic part (10) in relation to a seal opening (5).

7. The seal as claimed in claim 6, wherein the clearance (16) is configured so as to be closed in an encircling manner.

8. The seal as claimed in claim 7, wherein the clearance (16) is delimited by two mutually opposite lip-type, elastically deformable portions (11, 13) that fluidically increase the force of flow, said two portions (11, 13) forming an entry opening (18) for a fluid.

9. The seal as claimed in claim 1, further comprising at least one lip-type, elastically deformable portion (7) that fluidically increases the force of flow and is molded on the seal (4) on the outside toward the valve body in relation to a seal opening (5).

10. The seal as claimed in claim 9, wherein the lip-type portion (7) is configured so as to be closed in an encircling manner.

11. The seal as claimed in claim 1, wherein the first end side (S$_I$) of the seal (4) is set at an angle to a longitudinal direction (X-X) of the seal (4), in a manner corresponding to the shape of the valve body (6).

12. The seal as claimed in claim 11, wherein the first end side (S$_I$) encloses an angle of about 45° to 75° with the longitudinal direction (X-X).

13. The seal as claimed in claim 1, wherein the seal (4) is formed in a toroidal or at least substantially toroidal manner.

14. The seal as claimed in claim 1, wherein the second plastic part (12) as the hard seal element is made of a PTFE plastic.

15. A fluid control valve having at least one seal (4) as claimed in claim 1 for sealing off a connection region of the fluid control valve (2).

16. The fluid control valve as claimed in claim 15, configured as a selector control valve.

17. The fluid control valve (2) as claimed in claim 16, configured as a cooling water control valve.

18. The fluid control valve as claimed in claim 17, wherein the fluid control valve (2) is configured as a cooling water control valve of a vehicle.

19. The seal as claimed in claim 1, wherein a cross section of the at least one support element (14) and the at least one protrusion (14$_r$) is T-shaped.

* * * * *